United States Patent [19]

Williams

[11] Patent Number: 4,530,713

[45] Date of Patent: Jul. 23, 1985

[54] UREA-FORMALDEHYDE FERTILIZER SUSPENSIONS

[75] Inventor: James H. Williams, Louisville, Ky.

[73] Assignee: Borden, Inc., Columbus, Ohio

[21] Appl. No.: 517,040

[22] Filed: Jul. 25, 1983

[51] Int. Cl.³ ............................................. C05C 9/00
[52] U.S. Cl. .................................... 71/28; 71/64.07; 71/64.13
[58] Field of Search .................... 71/28-30, 71/64.07, 64.13; 564/60

[56] References Cited

U.S. PATENT DOCUMENTS

| | | | |
|---|---|---|---|
| 2,955,930 | 10/1960 | Kealy | 71/29 |
| 3,096,163 | 7/1963 | Waters et al. | 71/28 |
| 3,462,256 | 8/1969 | Justice et al. | 71/28 |
| 3,677,736 | 7/1972 | Formaini | 71/28 |
| 3,920,390 | 11/1975 | Petersen et al. | 8/185 |
| 4,120,685 | 10/1978 | Vargiu et al. | 71/30 |
| 4,298,512 | 11/1981 | Sartoretto et al. | 260/29.4 |
| 4,378,238 | 3/1983 | Goertz | 71/28 X |
| 4,409,015 | 10/1983 | Grace, Jr. | 71/28 |

FOREIGN PATENT DOCUMENTS 532326  10/1956  Canada .

Primary Examiner—Ferris H. Lander
Attorney, Agent, or Firm—Robbins & Laramie

[57]  ABSTRACT

A process for preparing a ureaform type resin fertilizer as an aqueous suspension which is stable and preferably has an Availability Index of at least 70 which, in a preferred embodiment, comprises: adding urea to an acidic solution of formaldehyde having a pH of 0.25 to 1.75 at a rate of addition to keep the temperature below 98° C. until the mole ratio of formaldehyde to urea is from 3.5:1 to 2.6:1; adjusting the pH of the reaction mixture to between about 5.2 and 6.8 and the temperature from about 75° C. to 92° C. and adding urea until a formaldehyde to urea mole ratio of 0.5:1 to 1.8:1 is attained and the nephelometric turbidity of the reaction mixture is in the range of 200 to 800 NTU units; and then neutralizing the reaction mixture to a basic pH not exceeding about 8.5.

35 Claims, No Drawings

UREA-FORMALDEHYDE FERTILIZER SUSPENSIONS

RELATED APPLICATIONS

This patent application is related to my copending patent application Ser. No. 416,573 filed on Sept. 10, 1982 entitled "Hydrolytically Stable Urea-Formaldehyde Resins and Process of Preparation". Said copending application discloses and claims a process for preparing urea-formaldehyde resins, and the resins so prepared, by charging urea to formaldehyde at a pH of about 0.5 to 2.5 until a certain molar ratio and viscosity are attained, then neutralizing the reaction mixture and finally adding urea to obtain a resin having a molar ratio of about 1 to 1.2 moles of formaldehyde per mole of urea.

This patent application is also related to my copending patent application Ser. No. 416,574 filed on Sept. 10, 1982 and entitled "Improved Wood Composites of Low Formaldehyde Emission". Said copending application discloses the use of resins from the prior copending application, Ser. No. 426,573, in bonding lignocellulosic material.

Both of these earlier applications are expressly incorporated herein by reference.

This patent application is also closely related in subject matter to the copending, commonly assigned application of T. T. Grace, Jr., Ser. No. 348,040, filed Feb. 11, 1982. That application discloses a two-stage process for preparing an aqueous dispersion of a urea-formaldehyde condensation product. In a first stage, formaldehyde and urea are reacted in a molar ratio of formaldehyde to urea in the ratio from about 2.5:1 to about 4.7:1 in the presence of a condensation catalyst, preferably alkaline, for methylolation of the urea, then at an acid pH until the methanol tolerance is in a range such that the condensate is clear and will remain clear, substantially free from precipitated reaction material, upon storage for one year at room temperature, to form an intermediate reaction product. In the second stage, the intermediate reaction product is reacted with an additional amount of urea sufficient that the overall molar ratio of urea to formaldehyde is in the range from 0.8:1 to about 1.7:1, at an acid pH and at an elevated temperature not above about 70° C., until the amount of water insoluble nitrogen present in the reaction mixture is in the range from about 15% to about 35% based on the total amount of nitrogen in the system. Application Ser. No. 348,040 is also incorporated herein by reference.

BACKGROUND OF THE INVENTION

This invention relates to liquid fertilizers. More particularly, it relates to fertilizer compositions containing ureaform in suspension. These compositions have long-lasting nitrogen release characteristics. The invention also relates to processes for preparing the fertilizer compositions.

Liquid mixed fertilizers are solutions of compounds which, for the most part, are very water-soluble and can supply two or all three of the primary plant nutrients: nitrogen, phosphorus measured as $P_2O_5$, and potash measured as $K_2O$. Although nitrogen-potash, nitrogen-phosphorus and nitrogen-phosphorus-potash suspensions can be made by the process of this invention, the present invention is directed primarily to suspensions containing only nitrogen.

Ureaform is a term which is used to denote mixtures of compounds of different degrees of solubility formed by the reaction of urea and formaldehyde under acid conditions, when the reaction mixture contains at least one mole of urea per mole of formaldehyde. The products of the reaction are shown below:

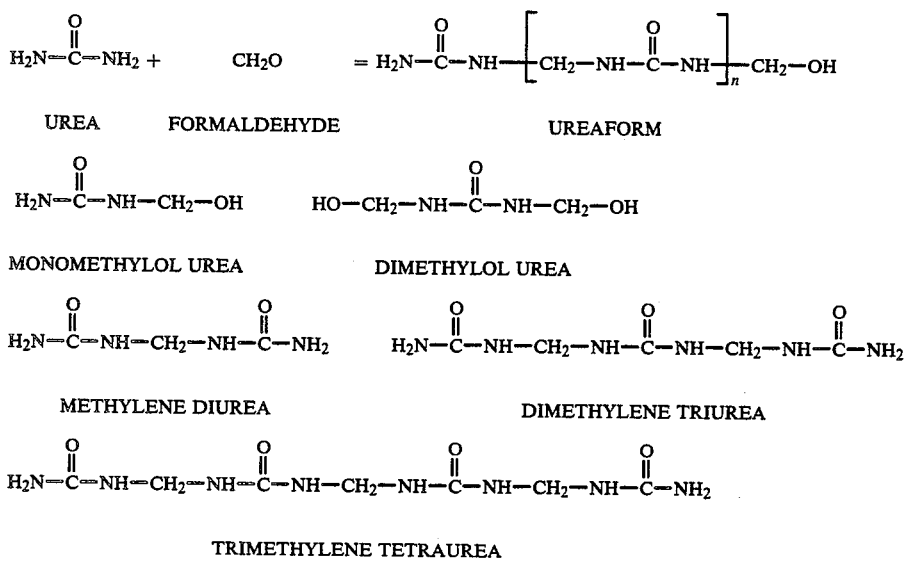

These products differ in length of chain and end group present. The methylol ureas are made primarily with a urea to formaldehyde ratio of less than one and their formation is usually catalyzed by bases. These compounds can be mixed with fillers and heated a second time to effect further polymerization and crosslinking into a resin which has no appreciable water solubility and no value as a fertilizer material because of its exceptionally slow degradation in the soil. When the urea to formaldehyde ratio is more than one, and an acid catalyst is used, methylene diurea and the related longer chain materials are formed and it is these compounds that are useful as slow-release nitrogen fertilizer materials.

The overall solubility of the ureaform material is quite low so that the product does not form highly concentrated solutions that have a tendency to burn vegetation. Moreover, the nitrogen therein becomes available as a plant nutrient over a period of time so that unusually heavy applications of the material may be made without damaging or over-feeding the plant life. The low water solubility of the ureaform fertilizer results in a high Availability Index (defined below).

For some time, it has been recognized that the measurement of the cold-water-insoluble nitrogen (CWIN) and also the measurement of that portion of the cold-water-insoluble nitrogen which is insoluble in hot water or insoluble in a buffered hot aqueous solution (HWIN), such as a hot aqueous phosphate solution, will give a good characterization of a desired fertilizer. A relationship between these two solubilities has been determined by an accepted test and is given the name of Availability Index (A.I.).

The A.I. is an empirical approximation of the water-insoluble nitrogen available for nitrification over a period of about six months, and is determined by the formula:

$$\text{Availability Index} = \frac{\% \text{ CWIN} - \% \text{ HWIN}}{\% \text{ CWIN}} \times 100$$

Where CWIN means cold-water-insoluble nitrogen, i.e., nitrogen that is not soluble in water at $25° \text{C}. \pm 2° \text{C}.$, and HWIN means nitrogen insoluble in a hot aqueous solution of a phosphate buffer, namely $KH_2PO_4$ and $K_2HPO_4$, which has a pH of 7.5. The A.I. is a measure of how fast the water-insoluble nitrogen nitrifies in the soil. The larger the number, the faster the rate of nitrification.

An A.I. of 40 or greater has been considered satisfactory for urea-formaldehyde products useful in fertilizer applications, but higher values are recognized as being even better. The A.I. values for various products manufactured by typical prior art acidic processes are only in the range of 40 to 50, with the cold-water-insoluble nitrogen usually in the range of 60% to 70%.

The cold-water-insoluble nitrogen fraction is a measure of the entire amount of nitrogen available for plant nutrition over an extended period of time. It is better when it is quite high. While the A.I. indicates the relative amount of that portion of the long-lasting nitrogen which becomes available within about a six month period, it is not a precise measurement of the exact amount of nitrogen available within a six month period.

The methods for determination of the cold-water-insoluble nitrogen (CWIN) and hot-water-insoluble nitrogen (HWIN) are given in the *Official Methods of Analysis of the Association of Official Analytical Chemists,* Thirteenth Edition, 1980. This same publication also contains procedures for determining the other two nutrients in fertilizers; namely, potassium and phosphorus.

The production of liquid fertilizer formulations containing slow-release nitrogen has made use of several different procedures. For example, U.S. Pat. No. 3,462,256, to G. H. Justice and R. E. Formaini, describes urea-formaldehyde concentrates which are aqueous solutions containing about 80% to 90% by weight of partially reacted urea and formaldehyde in a mole ratio about 1:1 but less than 2:1. The aqueous solution is prepared by heating the urea-formaldehyde mixture with 0.3% to 6% ammonia at a temperature between 75° C. and 100° C. while maintaining the pH between 9.0 and 9.8 with strong alkali. Heating is continued and pH is adjusted, the patent says, until at least 50%, but no more than 80%, of the formaldehyde is in the form of methylene groups.

A different procedure involving a suspension technique is outlined in U.S. Pat. No. 3,677,736. This patent describes a liquid fertilizer suspension containing ureaform having a water-insoluble nitrogen content of at least 1.5% and an A.I. in excess of 60. The process for producing the suspension involves diluting a urea-formaldehyde reaction product having a mole ratio between 1:1 and 2:1 with water to form a 35% to 65% solution. The pH of the solution is lowered to 5, heated to a temperature range of 30° C. to 80° C. to form a suspension, and then the final pH is adjusted to above 5 with an alkaline material.

In addition to both the aqueous concentrates and suspension techniques, in situ urea-formaldehyde reactions have also been reported in U.S. Pat. No. 3,096,168. In this procedure, liquid mixed fertilizers containing a suspended precipitate of ureaform can be prepared by mixing specified portions of water and soluble fertilizer ingredients and reacting therein 1 to 2.5 moles of urea per mole of formaldehyde under acidic conditions to form a ureaform product.

Aqueous dispersions of urea-formaldehyde polymers have also been modified with saturated aldehydes having 2 or more carbon atoms. The high aldehydes are said to act as inhibitors of further polymerization and thus produce a stabilized ureaform material. Alcohols and sugar additives have also been used to stabilize suspensions of urea-formaldehyde polymers in addition to aqueous ammonia solutions.

Typical processes known in the art of manufacturing urea-formaldehyde fertilizers have permitted little or no control over the amount of hot-water-insoluble (HWIN) that is formed in the reaction. Also, low pH condensation conditions have generally not been utilized, since it is extremely difficult to control the rate of polymerization at pH values less than 1. At pH values greater than 1, higher carbon aldehydes, sugar and alcohols are used to stabilize the final product.

The term "stability", as applied to a liquid fertilizer material based on urea-formaldehyde condensation products, also refers generally to the maintenance of the material in a readily flowable state. Stability is usually adversely affected when the WIN is present in very fine particle size, and also when the total amount of WIN particles present is below about 10% or above about 35% by weight based on the total nitrogen present.

SUMMARY OF THE INVENTION

This invention provides a new acid catalyzed amino-formaldehyde condensation product, in the form of a stable suspension. This new product is useful as a fertilizer that has improved characteristics and which does not present such problems in manufacture as have been presented in the prior art. The term "stable suspension" means a homogeneous ureaform suspension with a viscosity less than 150 cps over a minimum holding period of 109 days. A "stable suspension" also includes a ureaform product that may settle, but can be easily agitated to re-form a homogeneous suspension with a viscosity less than 400 cps after a minimum holding period of 150 days at room temperature.

The preferred product of the invention is a urea-formaldehyde resin suspension. This resin has a chemically modified skeletal structure as compared to prior art resins. The resin contains substantially more methylene groups than methylene ether groups. As a result, the urea-formaldehyde condensation product is more stable and has a higher Availability Index than prior art products, generally 70 or higher.

The urea-formaldehyde resin product of this invention can contain from about 0.4 to 1.8 moles of formaldehyde for each mole of urea. Preferably, the resin product contains from about 0.75 to 1.5 moles of formaldehyde for each mole of urea and more preferably from about 0.9 to 1.1 moles of formaldehyde for each mole of urea.

A novel urea-formaldehyde condensation product is prepared, according to one embodiment of the invention, by a process in which urea is added to a very acidic solution of formaldehyde, preferably at pH 0.5 to 1.1, at a rate such that the exotherm and formaldehyde to urea (F/U) mole ratio are controlled to designated parameters. When the first stage F/U mole ratio has been attained, in the range 3.5:1 to 2.6:1, the reaction mixture is stirred to permit equilibration to occur. The pH of the reaction mixture is then raised to 5.2 to 6.8, or better yet, 5.5 to 6.0, but preferably 5.7 to 6.3, and more preferably 5.8 to 6.0, and additional urea is added to attain an F/U mole ratio of 0.4 to 1.5 moles of formaldehyde per mole of urea. Condensation is then continued until the suspended particulate and colloidal matter reaches a particular "nephelometric turbidity unit" (NTU) range of 200 to 800, preferably 400 to 775 NTU units, and most preferably 680–730 NTU units. When the target range has been attained, the solution is neutralized to a pH above 7 and water may be added to produce a specific solids content.

The product of this invention remains as a polymer in the aqueous medium, generally in the form of a very fine dispersion. It is not condensed to a granular state, since the degree of polymerization is controlled by the use of a turbidimeter. Generally its viscosity as produced may be over 200 cps, such as 200–350 cps, but this initial viscosity backs off and drops, so that it is usually in the range 20–110 cps after several days. The addition of a stabilizing agent, if used, generally raises the viscosity to 20–250 cps, at 72° F. to 110° F.

The product is stable even in the absence of stabilizing agents, and is characterized by a high Availability Index, contains a minimum of 18% nitrogen plant nutrient, and contains a high proportion of methylene groups (bridges) in the ureaform product. This product can be used alone as a source of primary nitrogen nutrient for plants or, when mixed with solutions of compounds which for the most part are very soluble in water, provides a fertilizer formulation that can supply at least two or three of the primary plant nutrients: nitrogen, phosphorus measured as $P_2O_5$, potassium measured as $K_2O$, and as well, other nutrient and micronutrient values.

One advantage of the process of the invention is that the process permits control over the nitrogen availability in the condensation product produced. The process is flexible so that is is possible to regulate the nitrogen availability to match end use conditions and crop requirements, without the addition and reaction of stabilizing compounds. In addition, the process is conducted under controlled pH conditions where the exotherm of the reaction provides the majority of the heat requirement for polymerization. As a result, the use of energy is minimized. The product can provide a greater proportion of its total available nitrogen in a slow-release form, and yet provide an increased amount of available nitrogen during the approximately six-month period following application to the soil, as compared to prior art products. For example, the invention makes it possible to have fertilizer ureaform compositions with an Availability Index of 70 or higher.

DETAILED DESCRIPTION OF THE INVENTION

This invention selectively synthesizes a urea-formaldehyde condensation product by controlling the initial mole ratio, pH and temperature of the aqueous system and thereby controlling the condensation reaction. This forms a variety of methylene-urea polymers having varying chain lengths. The product is a stable urea-formaldehyde suspension with a high Availability Index.

The first stage of the process of this invention is an acid catalyzed reaction, conducted in a strongly acidic environment. This procedure not only forms the methylenediurea linkages and their condensation products, but the exothermic character of the reaction eliminates the need for the application of heat in the first stage. The exotherm is sufficient to drive the reaction to the desired level of condensation, and the temperature of the reaction mixture can be controlled by a programmed addition of the urea to the acidified formaldehyde solution.

The second stage of the reaction is carried out at a higher pH, generally 5.2 to 6.8. Minimal heat is required during the second stage of condensation in order to drive the reaction to a more advanced level of condensation.

This new process reduces the cycle time relative to the conventional alkaline-acid manufacturing process by 30% or more, and also requires minimal energy consumption. This process produces a ureaform end product that contains a high proportion of methylenediurea bridge linkages (methylene groups or methylene bridges and related longer chain materials), is characterized by an Availability Index greater than 70, and has a greater amount of stability than comparable prior art products that have been stabilized with aldehydes, sugars, or alcohols.

In the first stage of the process, a formaldehyde solution is adjusted to a highly acid pH, 0.25 to 1.75, preferably 0.5 to 1.5, or better, 0.5 to 1.1, and more preferably 0.9 to 1.1 by the addition of an appropriate acid. In accordance with one embodiment of the invention, the formaldehyde solution used preferably contains about 49.8% to about 50.2% formaldehyde. Although other formaldehyde solutions, e.g., 37% concentration or those having a formaldehyde content of about 33% to 52% can be utilized, it is preferred to use the 49.8% to 50.2% solutions because they yield a condensation product that can be more easily diluted to the desired solids content. To obtain the preferred amount of formaldehyde, the formaldehyde solution is assayed and the formaldehyde content is adjusted as necessary.

The pH is adjusted preferably to a pH of 0.5 to 1.5, preferably about 0.9, using any suitable inorganic or organic acid which will reach this pH range. Suitable acids include, but are not limited to, formic acid, hydrochloric acid, sulfuric acid, and p-toluenesulfonic acid, or a combination of two or moe of these. Of these acids, sulfuric acid is preferred.

Urea is then slowly charged to the acidic formaldehyde at a rate that is controlled so as to maintain a temperature preferably above 50° C. but not above 98° C. As a result, no additional heat is required.

The urea can be charged in separate increments, or at a continuous slow rate, until a particular mole ratio is reached. The reaction mixture is stirred or agitated throughout the addition. The urea is preferably added in 15 equal increments. The amount of urea added in this first stage is such that a mole ratio of 3.5:1 to 2.6:1 is obtained. At a lower formaldehyde to urea molar ratio, the reaction mixture tends to gel in the reactor. A mole ratio of 3.1:1 to 2.9:1 is preferred and the most preferred ratio is 3.0:1. The rate of addition of the equal increments of urea is programmed so that the temperature of the reaction mixture is maintained close to or below 98° C. Alternatively, the increments of urea can be added at equal time intervals, or on a continuous basis but over the same time frame. Upon completion of the urea addition, the reaction mixture is stirred for a period of time sufficient for substantial equilibration to occur. Ten to fifteen minutes usually suffices.

The pH is adjusted to 5.2 to 6.8, but preferably within the general range 5.8 to 6.0, and the mixture is then maintained at a temperature of about 75° C. to 92° C., preferably about 83° C. to 87° C., with continued stirring or agitation. Urea is added to attain the desired F/U mole ratio of 0.5:1 to 1.8:1, preferably 0.75:1 to 1.5:1, and most preferably 0.9:1 to 1.1:1, and until a 200 to 800 nephelometric turbidity unit (NTU) reading is reached on a laboratory nephelometer. The nephelometer is used to determine the whiteness of the resin. Before use, it is standardized by forming a mixture of 0.3 ml. of resin and 100 ml. of water, and pouring this mixture into the instrument for measurement.

Until the nephelometric turbidity unit reading is in the range of 200 to 800, the reaction mixture is maintained within the above specified temperature range of 75° C. to 92° C.; thereafter, it is neutralized to a pH of 7.1 to about 8.5, preferably 7.3 to 7.5, by the addition of any suitable inorganic or organic base or combination of bases. Suitable bases include, but are not limited to, sodium hydroxide, ammonia, triethanolamine and triethylamine, or a combination of two or more of these. It is preferred to use a 50% solution of sodium hydroxide in combination with triethanolamine.

After the adjustment in pH, a final charge of urea is made, if necessary, to adjust the ureaform type resin to a desired nitrogen level and within the F/U range 0.9:1 to 1.1:1. At the 1.0:1.0 F/U mole ratio stage, an 18-0-0 ureaform product is obtained. A third (final) charge of urea may be added, for example, if a 26-0-0 ureaform product is the desired final product.

Since reactant concentrations can differ within wide ranges, generally the solids content of the product can have a value within a broad range. For practical reasons this range ordinarily will be 40% to 70%, but preferably the solids content will be in the range 45% to 65%, and more preferably, 49% to 51%.

The ureaform product prepared in one preferred embodiment is formed from a reaction mixture made up from: 39.52 weight percent of the formaldehyde solution which corresponds to 19.66 to 19.86 weight percent formaldehyde with the remainder being water; 39.52 weight percent urea; 20.54 weight percent water; the remainder being the acid and base materials which have been added for pH adjustment. Xanthan gum and guar gum can also be added, and these function as suspending agents. The final liquified product "A" has a solids content in the range of 49% to 53% and a specific gravity (Westphal) of 1.272 to 1.278, preferably 1.275. The final pH is 7.3 to 7.5 and the Brookfield viscosity measured at 25° C., using an RVF viscometer with a No. 1 spindle at 20 rpm, is from 150 cps to 200 cps.

The formation of methylenediurea functionality and related longer chain materials that are useful as slow-release nitrogen fertilizers can be demonstrated in the products of this invention through structural analysis using conventional techniques. The techniques allow the determination of the following structural groups in the urea-formaldehyde ureaform condensation product "A", as well as in a conventional acid catalyzed 1.0:1.0 urea-formaldehyde mole ratio adhesive resin: free formaldehyde, total formaldehyde, methylol, methylene, and methylene ether.

A representative comparison of the quantitative analyses of a ureaform product prepared according to a preferred embodiment of the present invention, and of a conventional acid catalyzed urea-formaldehyde adhesive resin, is reported in Table I below.

The ureaform product in Table I was prepared generally according to Example 1, below.

The urea-formaldehyde adhesive used for comparison purposes was made from an aqueous formaldehyde solution containing 50% formaldehyde. 49.78 grams (0.83 moles) of this formaldehyde solution was charged to a reactor and agitation and stirring were initiated. The pH of the formaldehyde solution was adjusted to pH 1.0 using sulfuric acid. The temperature of the solution was raised to 50° C. Then 16.93 grams (0.282 moles) of prilled urea were charged into the formaldehyde solution in 15 equal increments over a 15 minute time period, maintaining the temperature between 50° C. and 70° C. The mole ratio at this stage was 2.9:1.

After the urea was charged, the mixture was stirred for 15 minutes to a Gardner viscosity of "T+". Then the pH of the reaction mixture was raised to pH 7.2 by the addition of 0.05 grams of a 50% sodium hydroxide solution and the necessary amount of triethanolamine. Then a final charge of 32.85 grams (0.548 moles) of prilled urea was added to the reaction mixture, bringing the F/U mole ratio to 1.0:1.0. The pH was then adjusted to 7.2 with triethanolamine and stirring was continued for 30 minutes. The reaction was then complete.

TABLE I

| Quantitative Results for Determination of Methylene Functional Groups in Two UF Products: Expressed as % of Total Weight of the Liquid Product | | |
|---|---|---|
| | Ureaform Product A Prepared According to a Preferred Embodiment of the Invention (1.0:1.0) F/U Mole Ratio | Acid-Condensed UF Formaldehyde Adhesive Resin for Comparison (1.0:1.0 F/U) Mole Ratio |
| Total Formaldehyde | 19.15% | 23.18% |
| Oxidable Formaldehyde* | 8.74 | 16.73% |
| Methylene (by difference) | 10.41% | 6.45% |

*Oxidable formaldehyde is defined as the total formaldehyde resulting from both the methylol and the methylene functional groups, plus free formaldehyde.

The results of these analyses indicate the methylene content, which was determined by subtracting oxidable formaldehyde values of the two resins from the total formaldehyde used in preparing the two resins, respectively. The methylene content of the ureaform product prepared as above, according to the invention, was 10.41%, whereas in a comparable, typical acid condensed urea-formaldehyde adhesive resin, the methylene content found was 6.45%.

The methylol contents were also determined for each of these two resins using conventional techniques. In this manner the methylene ether content can be calculated. The results are reported below in Table II.

TABLE II

Quantitative Results for Determination of Ether Functional Groups in Two UF Products: Expressed as % of Total Weight of the Liquid Product

|  | Ureaform Product A (1.0:1.0 F/U Mole Ratio) | Urea-Formaldehyde Adhesive (1.0:1.0 F/U Mole Ratio) |
|---|---|---|
| Oxidable Formaldehyde | 8.74% | 16.73% |
| Free Formaldehyde | — | — |
| Methylol | 3.08% | 11.84% |
| Methylene Ether (by difference) | 5.66% | 4.89% |

The methylene ether content was determined by analyzing for the methylol content, and then subtracting this value from the oxidable value. For example, the ureaform product A was found to have 8.74% oxidable functionality and 3.08% methylol content. The difference between the two is 5.66%, which represents the percentage of methylene ethers in the ureaform product. Table II above shows that the ureaform product has more methylene ether functionality in the liquid form than the urea-formaldehyde adhesive.

A summary of the analysis of the functional groups for both the ureaform product A and the urea-formaldehyde adhesive are shown below in Table III.

TABLE III

Summary of Functional Groups in Two UF Products; Expressed as % of Total Weight of the Liquid Product

|  | Ureaform Product A (1.0:1.0 F/U Mole Ratio) | Urea-Formaldehyde Adhesive (1.0:1.0 F/U Mole Ratio) |
|---|---|---|
| Free Formaldehyde | — | — |
| Methylol | 3.08% | 11.84% |
| Methylene Ether | 5.66% | 4.89% |
| Methylene | 10.41% | 6.45% |
| Total Formaldehyde | 19.15% | 23.18% |

The results shown in Tables I, II and III are expressed as percentages of the total weights of the liquid products, but it is more meaningful to express the functionality relationships as percentages of the respective total formaldehyde contents. Table IV reports these relationships.

TABLE IV

Functionality Relationships Expressed as % of Total Formaldehyde Content

|  | Ureaform Product A (1.0:1.0 F/U Mole Ratio) | Urea-Formaldehyde Adhesive (1.0:1.0 F/U Mole Ratio) |
|---|---|---|
| Free Formaldehyde | — | — |
| Methylol | 16.08% | 51.08% |
| Methylene Ether | 29.56% | 21.09% |
| Methylene | 54.36% | 27.83% |
| Total Formaldehyde | 100.00% | 100.00% |

It can be seen from the above that the ureaform product of the invention has more methylene ether and methylene functional groups than the conventional acid catalyzed urea-formaldehyde adhesive. For example, the ureaform product contains 29.56% and 54.36% methylene ether and methylene functionality versus the 21.09% and 27.83%, respectively, for the urea-formaldehyde adhesive.

The data presented in Table IV demonstrate that the new manufacturing procedure using about a 1.0:1.0 F/U mole ratio resin can change the chemical structure and skeleton of the resin relative to a conventional urea-formaldehyde adhesive. This change is reflected in the structural relationships within the two products. The ureaform product has more methylene ether functionality and more methylene functionality, and this is reflected in an Activity or Availability Index for a urea-formaldehyde product, whereas the urea-formaldehyde adhesive itself has no water-insoluble nitrogen content, and therefore, no Availability Index. The high degree of methylene functionality in the ureaform product conributes to its slow release nitrogen capability, and therefore, to its high Activity Index that will be reflected later in the examples below.

When stabilizing agents are to be incorporated in a formulation, the gums are preferred, that is, xanthan gum, guar gum, locust bean gum, and the like. Generally the total amount of stabilizer used will be from 0.01% to 0.1% by weight on solids, dry basis. The preferred stabilizer is a mixture of xanthan gum and guar gum. These gums may be used in the following amounts: xanthan gum, 0.01% to 0.1%, preferably 0.025% to 0.75%, and more preferably, 0.04% to 0.06%; guar gum, 0.01% to 0.09%, preferably 0.02% to 0.06%, and most preferably 0.25% to 0.035%.

In the following examples and elsewere throughout the specification, parts and percentages are by weight, and the temperatures are degrees Celsius, unless expressly indicated otherwise; mole ratios are the ratios of formaldehyde to urea unless indicated otherwise; and all viscosity determinations were made on an RVF Brookfield viscometer using a No. 1 spindle at 20 RPM and at 25° C., unless otherwise stated. Values reported for phosphorus and potassium contents are reported in the way that is customary in the fertilizer industry, i.e., P as $P_2O_5$, and K as $K_2O$.

EXAMPLE 1

Preparation of a Resin Suspension Useful as an 18-0-0Ureaform Product

An aqueous formaldehyde solution is assayed and found to contain 50% formaldehyde. 39.689 grams (0.661 moles) of this solution are charged to a reactor and agitation and stirring are initiated. The pH of the formaldehyde solution is adjusted to just less than 1 (0.97) using approximately 0.04 grams of concentrated sulfuric acid. The temperature of the solution is then raised to 50° C. Then 13.49 grams (0.225 moles) of prilled urea are charged to the formaldehyde solution in 15 equal increments over a 15 minute time period, maintaining the temperature between 50° C. and 95° C. The mole ratio at this stage is 2.94:1.

After the urea is charged, the mixture is held at 95° C. for five minutes and then the pH is adjusted preferably to 5.7 to 6.3 with 50% sodium hydroxide. A second charge of urea is added, 26.19 grams (0.436 moles). The pH is adjusted again to 5.8 to 6.0. The temperature of the reaction mixture is adjusted to 85° C. and held there until the resin particles turn white.

The whiteness of the resin suspension is determined by the use of a turbidimeter. The turbidimeter is first standardized with water. Then 0.3 ml. of the resin suspension is added to 100 ml. of water in a graduated cylinder. This mixture is shaken and then an appropriate amount is poured in the turbidimeter for measurement. When the turbidimeter measures between 200 and 800 NTU's the reaction mixture is immediately neturalized with approximately 0.25 grams of triethanolamine to a pH of 7.3 to 7.5. After the reaction mixture is neutralized, 20.3 grams of water are added and the pH is adusted to 7.3 to 7.5. The reaction is complete after cooling to room temperature.

The ureaform product is found to have the following characteristics: solids content, 50.48%; CWIN, 21.33%; HWIN, 6.06%; Availability Index, 71.59%; nitrogen content, 18.45%. This 18-0-0 ureaform product is stable at both 72° F. and 110° F. for a minimum of two months. The initial viscosity of the suspension is 265 cps at 72° F.; it drops upon aging for a few days.

EXAMPLE 2

Preparation of a Stabilized 18-0-0 Ureaform Product

This example demonstrates the use of xanthan gum and guar gum as stabilizing and suspending agents for the aqueous dispersion of the 18-0-0 ureaform product prepared in Example 1.

A solution of 0.025 grams of xanthan gum and 0.025 grams of guar gum dissolved in methanol was added to 1,000 grams of a slightly aged specimen of the Example 1 18-0-0 product, so that the weight of the gums was 0.005% based on the solids content of the resulting suspension. The mixture is then stirred for one-half hour. The viscosity of the dispersion is 265 cps at 72° C. and it has a storage life greater than 2 months at 72° F. and at 110° F. The resulting viscosity after the 2 month storage life test is 178 cps at 72° F. and 258 cps at 110° F. These viscosity values reflect the presence of the gums and the effect of aging.

EXAMPLE 3

Ureaform Suspension Formulated With Dispersing Agents

This example demonstrates the use of Calgon salt and Tamol N-Micro (Rohm & Haas) dispersing agents in the aqueous dispersion of the Example 1 18-0-0 ureaform.

Calgon salt, 0.25 grams (0.05% based on solids), and 0.625 grams (0.125% based on solids) of Tamol N-Micro dispersing agent are added to 1,000 grams of a slightly aged specimen of the Example 1 18-0-0 ureaform suspension. The mixture is still stable after two months of storage life, with a viscosity of 64 cps at 72° F. and 142 cps at 110° F.

EXAMPLE 4

Ureaform Suspension Formulated With a PVP Suspending Agent

This example demonstrates the use of a polyvinylpyrrolidone suspending agent for the aqueous dispersion of the 18-0-0 Example ureaform product.

An 8% solution of polyvinylpyrrolidone was prepared with a methanol solvent. 3.0 grams of the 8% solution (0.05% based on solids) was added to 1,000 grams of the 18-0-0 Example 1 suspension, a few days after it had been prepared. The initial viscosity of the mixture after stirring for one hour was 232 cps at 72° F. After two months of storage the viscosity was 68 cps at 72° F. and 166 cps at 110° F.

EXAMPLE 5

Preparation of a 20-0-0 Ureaform Dispersion at 55% Solids

A 55% solids 20-0-0 ureaform product can be made by a procedure like that described in Example 1. 43.65 parts of a 50% formaldehyde solution is adjusted in pH by approximately 0.06 parts of concentrated sulfuric acid. The initial urea addition is 14.84 parts, with a pH adjustment to 5.8 to 6.0 using approximately 0.03 parts of 50% sodium hydroxide.

The second urea addition amounts to 28.81 parts and the reaction is allowed to continue between 83° C. to 87° C. until the turbidimeter reading of 200 to 800 NTU's is obtained. The reaction is immediately neutralized with approximately 0.28 parts of triethanolamine. 12.33 parts of water are added to the final reaction mixture in order to adjust the solids content to 55%. The final F/U mole ratio was 1.0:1.0.

The viscosity of the product dispersion is 102 cps at 72° F. The solids content is 54.85%; CWIN, 22.36%; HWIN, 4.05%; Availability Index, 81.89%; and the nitrogen content is 19.98%. The product will separate into two phases after 21 days.

EXAMPLE 6

Stabilized 20-0-0 Ureaform Suspension

This example demonstrates the use of xanthan gum and guar gum as stabilizing agents for the 55% aqueous 20-0-0 Example 5 ureaform product.

A solution of 0.025 grams of xanthan gum and 0.025 grams of guar gum, dissolved in a minimum amount of methanol, is added to 1,000 grams of the 55% solids ureaform suspension of Example 5 so that the gums amounted to 0.005% by weight based on the solids content of the resulting dispersions. This dispersion is then stirred for approximately one-half hour. The viscosity of the resulting dispersion is 188 cps at 72° F. The dispersion has a storage life greater than two months. The resulting viscosity after 49 days is 232 cps at 72° F.

The storage life of the 18-0-0 Example 1 ureaform product is not extended by the suspending agents of Examples 2, 3 and 4. The use of guar gum and xanthan gum is necessary, however, for shelf life stability of the 55% solids 20-0-0 Example 5 ureaform suspension.

EXAMPLE 7

Preparation of a 26-0-0 Ureaform Suspension at 63% Solids

A 26-0-0 ureaform fertilizer is made by a procedure like that described for Example 1.

28.43 grams of a 50% formaldehyde solution is charged to a reactor. Agitation and stirring are initiated. The pH of the formaldehyde solution is adjusted to just under 1 using approximately 0.02 grams of concentrated sulfuric acid. The temperature of the solution is then raised to 50° C. Then 9.66 grams of prilled urea are slowly charged into the formaldehyde solution over a 15 minute period, maintaining the temperature between 50° C. and 95° C.

After the urea is charged, the mixture is held at 95° C. for five minutes. Sodium hydroxide (50%) is added to adjust the pH to 5.8 to 6.0. Then 18.76 grams of prilled urea are added and the pH again adjusted to 5.8 to 6.0. The reaction mixture is maintained at a temperature in the range of 83° C. to 87° C., and held at this temperature until it turns white.

A turbidimeter is used to determine the whiteness of the resin suspension, in the manner described above in Example 1. After obtaining a turbidimeter reading of about 720 NTU's, the reaction mixture is neutralized with approximately 0.19 grams of triethanolamine to a pH of 7.3 to 7.5. 14.78 grams of water and 28.06 grams of prilled urea are added to the neutralized mixture and the pH adjusted to 7.3 to 7.5. 0.04 grams of xanthan gum and 0.02 grams of guar gum dissolved in a minimum amount of methanol is added to the suspension. This is mixed for one-half hour. The reaction is then complete.

The solids content is 62.95%; CWIN, 15.20%; HWIN, 2.15%; Availability Index, 85.85%, and the nitrogen content is 24.15%. The viscosity is approximately 155 cps at 72° F. with a final pH of 7.3. The specific gravity on a Westphal balance is 1.260.

EXAMPLE 8

Adjustment of a 24% N Suspension to an 18-5-0 Slurry Product

An 18-5-0 slurry type fertilizer is made with 65.5 grams of the nominally 26-0-0 prepared suspension in Example 7. To this suspension 15.0 grams of diammonium phosphate and 19.5 grams of water are added. The mixture is stirred for one-half hour and is pumped through a colloid mill four times. The resulting suspension contains 18.42% total nitrogen, 5.5% phosphorus, and has a solids content of 47.92%. The Activity Index of the water-soluble nitrogen is 86.21; HWIN is 2.61, and CWIN is 18.92.

EXAMPLE 9

Preparation of a 20-5-0 Slurry Type Fertilizer

A 20-5-0 slurry type fertilizer can be made from the suspension prepared in Example 7.

A solution of 9.2 grams of diammonium phosphate and 21.2 grams of water are added to 69.5 grams of the suspension produced in Example 7, and the mixture is stirred for approximately one-half hour, then passed through the colloid mill four times. The suspension contains 49.61% solids. The total nitrogen is 19.82% and percent phosphorus, 5.0%. The Activity Index of the water-insoluble nitrogen is 83.50; the HWIN, 2.10%, and CWIN, 12.73%.

EXAMPLE 10

Preparation of a 20-15-5 Slurry Type Fertilizer

A 20-15-5 slurry type fertilizer is prepared from the 26-0-0 suspension of Example 7.

A solution containing 2.4 grams of water, 8.1 grams of potassium chloride, and 10.0 grams of urea is prepared. 29.5 grams of a commercial 10-34-0 ammonium polyphosphate fertilizer is added to this mixture and stirred for approximately 15 minutes. 50.0 grams of the 26-0-0 suspension of Example 7 is then added and the solution is stirred for an additional one-half hour. The suspension is passed through a colloid mill four times. The resulting suspension contains 19.47% nitrogen, 10.2% phosphorus, and 4.91% potassium, and has a solids content of 64.40%; an Activity Index of 78.16; 2.92% HWIN, and 13.37% CWIN.

EXAMPLE 11

Second Preparation of a 20-5-0 Slurry Type Fertilizer

A 20-5-0 slurry type fertilizer can be prepared from the 26-0-0 ureaform suspension of Example 7, by a different technique than that of Example 9.

Thus, a mixture is made of 72.6 grams of the 26-0-0 suspension of Example 7, 16.0 grams of a commercial ammonium polyphosphate (10-34-0), and 11.4 grams of water. This is stirred for one-half hour and then passed through a colloid mill four times. The resulting suspension contains 21.31% nitrogen and 6.1% phosphorus. The solids content is 54.19%. The Activity Index is 85.94; HWIN, 3.07%, and CWIN, 21.84%.

EXAMPLE 12

Preparation of a 12-6-3 Slurry Type Fertilizer

A 12-6-3 slurry type fertilizer is easily prepared from the 26-0-0 ureaform product of Example 7.

A solution of 17.14 grams of water and 4.86 grams of potassium chloride is prepared. To this solution, 19.10 grams of a commercial ammonium polyphosphate (10-34-0) and 58.90 grams of 16-0-0 are added. The mixture is stirred for one-half hour and passed through a colloid mill four times. The resulting suspension contains 12.70% nitrogen, 6.5% phosphorus and 3.11% potassium. The solids content is 43.53%; Activity Index on the water-insoluble nitrogen is 86.71, including a HWIN of 6.08% and a CWIN of 45.75%.

EXAMPLE 13

Pilot Plant Scale Suspension Production

A 40 gallon reactor was charged with 98.8 pounds of 50% formaldehyde and the pH adjusted with 0.075 pounds (34 grams) of concentrated sulfuric acid to a pH of less than 1.0. The formaldehyde was heated to 52° C. and 33.6 pounds of urea were charged in 15 separate additions over a 15 minute period. After the last urea addition, the reaction mixture was held at temperature for approximately five minutes.

After the five minute hold period, 56.75 grams of sodium hydroxide were added to adjust the pH to approximately 5.8 to 6.0. At this time, 65.2 pounds of urea were charged to the formaldehyde, and the pH was adjusted to the range of 5.8 to 6.9.

The temperature was then raised to 85° C. and the reaction mixture was allowed to condense further. The course of the condensation was followed on a turbidimeter until a reading of 420 NTU's was observed, about 40 minutes later. The reaction mixture was then immediately neutralized with 29.48 grams of triethanolamine (0.65 pounds). After stirring for several minutes, 51.35 pounds of water were added and the pH was adjusted to 7.3 to 7.5 with a small amount of formic acid.

After the pH adjustment, 56.7 grams of xanthan gum and 34 grams of guar gum, which had previously been dissolved in a minimum amount of methanol, were added to the reaction mixture. After stirring for approximately one-half hour, the final product was discharged into appropriate containers. The specifications of the product are as follows: total solids content, 49.6%; total nitrogen, 18.05%; WIN, 23.82%; HWIN, 4.2%; Activity Index, 82.37% specific gravity, 1.1889; pH, 7.56, and Brookfield viscosity, 105 centipoises. The relatively low initial viscosity of this pilot plant product is believed to be attributable to the use of high shearing force in the reactor. Such a relatively low initial viscosity might not be experienced in large, plant batch reactions, where a high shearing force is less feasible.

While it was not necessary to use guar and xanthan gum to stabilize the ureaform fertilizer suspension, this batch was made up using them in order to evaluate the manufacturing procedure and to permit a comparison of suspensions, with and without stabilizing agents. Their inclusion in the Example 13 formulation does not reflect on the stability of the product without their presence. A similar batch made up without using gum was acceptable, as is demonstrated in Example 14, below.

EXAMPLE 14

Pilot Plant Production Without Added Stabilizers

A 40 gallon reactor was charged with 78.96 pounds of formaldehyde at a 50% concentration. Sulfuric acid was charged to lower the pH to 0.63. Heat was applied to maintain the formaldehyde temperature at 50°±2° C.

Fifteen separate charges of urea, amounting to 26.86 pounds total, were added to the formaldehyde over a 15 minute period. After the addition of the fifteenth portion of urea, the reaction mixture was stirred for approximately 5 minutes at 76° C.

After the five minute stirring period, the pH was adjusted to 5.54 with sodium hydroxide and 52.1 pounds of urea were then charged to the reaction mixture. The pH was adjusted to 6.25 by the addition of sulfuric acid. The temperature was raised to 85° C. and the resin was stirred for about 36 minutes, until a turbidimeter reading of 640 was obtained. The reaction mixture was then neutralized to pH 7.3 with 45.4 grams of sodium hydroxide. Following neutralization, 41.02 pounds of water were added and the reaction mixture was adjusted to a pH of 7.56, with additional caustic and sulfuric acid adjustments. The reaction mixture was allowed to stir for approximately one-half hour, and then was placed in appropriate containers.

The viscosity of this suspension product was 27.5 centipoises using the Brookfield viscometer. The suspension had a specific gravity of 1.202; total solids content, 49.98%; total nitrogen, 17.98%; WIN, 23.72%; HWIN, 4.01%, and the Availability Index was 83.09.

GENERAL

Products prepared in accordance with preferred embodiments of the invention will be U-F condensation products in the form of dispersions of fine particles in aqueous media. The solids content generally will be 49% to 53%, preferably close to 50%. The specific gravity Westphal, fresh, will be 1.272 to 1.278, and after 24 hours, 1.274 to 1.280. The pH should be 7.3 to 7.5. Aged viscosity (Brookfield) should be in the range 20 to 250 cps, preferably about 200 cps, even after storage at room temperature (72° F.) for three months or more. While the formaldehyde to urea mol ratio may fall within a range such as 0.9:1 to 1.1:1, the most preferred value is 1.14:1.

Using the techniques of the invention as described above, four fertilizer-type suspensions were prepared for purposes of comparison: 17-0-0; 18-0-0; 20-0-0, and 24-0-0, having different amounts of solid ureaform material: 45%; 50%; 55%; and 63%, respectively.

The key characteristics of these four formulations are reported in Table IV, below.

TABLE V

Activity Index Data on Four Fertilizer Suspensions

| Solids Content | CWIN, % | HWIN, % | A.I. | % Nitrogen |
| --- | --- | --- | --- | --- |
| 45.01 | 19.41 | 2.47 | 87.27 | 17.12 |
| 50.48 | 21.33 | 6.06 | 71.59 | 18.45 |
| 54.85 | 22.36 | 4.05 | 81.89 | 19.98 |
| 62.95 | 15.20 | 2.15 | 81.85 | 24.15 |

The data in Table V suggest that the Activity Index can be adjusted to meet specific needs by altering the solids content of the formulation. The 45% solids formulation appears to be an exception to the trend. However, the 45% formulation has a shelf life of four days maximum and is not a viable product when periods of usage are beyond this time.

Extensive storage life tests were run on the 20-0-0 and 18-0-0 formulations. The control of the resin particle sizes brought about by condensing the resin to a specific nephelometric tubidity unit (NTU) range results in stable suspensions. No suspending or stabilizing agents are generally necessary in order to obtain a reasonable one-month storage life. Different stabilizing agents were evaluated, however, in order to compare storage lives with and without modification.

Tables VI and VII tabulate the storage life data for the several 18-0-0 and 20-0-0 formulations found in the examples. Storage life studies at both 72° F. and 110° F. were run on the 18-0-0 formulations.

TABLE VI

72° F. and 110° F. Storage Studies on 18-0-0 Suspensions, 50% Solids Formulations (Viscosity, cps)

| Example Number | 0 Days | 7 Days | 14 Days | 21 Days | 28 Days | 49 Days | 109 Days |
| --- | --- | --- | --- | --- | --- | --- | --- |
| 72° F. | | | | | | | |
| 1 | 265 | 91 | 42 | 50 | 48 | 44 | 104 |
| 2 | 188 | 228 | 162 | 162 | 184 | 178 | 198 |
| 3 | 38 | 69 | 41 | 42 | 42 | 68 | 176 |
| 4 | 232 | 117 | 50 | 56 | 120 | 68 | 185 |
| 110° F. | | | | | | | |
| 1 | 265 | 47 | 62 | 102 | 136 | 127 | 202 |
| 2 | 188 | 118 | 224 | 266 | 280 | 258 | 319 |
| 3 | 38 | 94 | 105 | 157 | 192 | 163 | 254 |
| 4 | 232 | 165 | 106 | 152 | 228 | 181 | 252 |

Example 1 = Ureaform suspension.
Example 2 = Example 1 suspension plus 0.025% xanthan gum and 0.025% guar gum dissovled in a minimum amount of methanol.
Example 3 = Example 1 suspension plus Calgon (0.05% × solids) and Tamol N-Micro (0.125% × solids).
Example 4 = Example 1 suspension plus PVP (.05% × solids), added as an 8% solution.

TABLE VII

72° F. Storage Studies on 20-0-0 Suspensions, 55% Solids Formulations (Viscosity, cps)

| Formulation | 0 Days | 7 Days | 14 Days | 21 Days | 28 Days | 49 Days | 109 Days |
| --- | --- | --- | --- | --- | --- | --- | --- |
| Example 5 | 102 | 60 | 62 | (1) | (2) | — | — |
| Example 6 | 188 | 167 | 228 | 250 | 296 | 247 | 348 |
| C | 66 | 63 | 105 | (1) | (2) | — | — |

TABLE VII-continued

72° F. Storage Studies on 20-0-0
Suspensions, 55% Solids Formulations
(Viscosity, cps)

| Formulation | 0 Days | 7 Days | 14 Days | 21 Days | 28 Days | 49 Days | 109 Days |
|---|---|---|---|---|---|---|---|
| D | 74 | 58 | 106 | (1) | (2) | — | — |

Example 5 = Ureaform suspension.
Example 6 = Example 5 suspension plus 0.025% xanthan gum and 0.025% guar gum dissolved in a minimum amount of methanol.
Formulation C = Example 5 suspension plus Calgon (0.05% × solids) and Tamol N-Micro (0.125% × solids).
Formulation D = Example 5 suspension plus PVP (.05% × solids), added as an 8% solution.
(1) means that phase separation or syneresis occurred.
(2) means that the product gelled.

The storage stabilities of the 18-0-0 formulations exceed 109 days for both the 72° F. and 110° F. studies. The highest viscosity observed in the tests reported in Table VI was 319 centipoises, and all samples were heterogeneous and in stable suspensions. No settling could be detected.

The room temperature (72° F.) storage life tests on the 20-0-0 formulation stabilized with xanthan gum and guar gum, Example 6, indicated that this formulation was also stable after 109 days. The highest viscosity observed for the Example 6 formulation was 348 centipoises, and the suspension was stable. Twenty-eight days, however, was the maximum storage life for the other three samples evaluated as reported in Table VII.

While many different ureaform formulations ranging from 45% to 55% in solids contents can be manufactured, the preferred formulation is the 18-0-0 at 50% solids without stabilizing agents. Other fertilizer formulations can be made readily. Thus, 5-0-0 compositions to 30-0-0 compositions can be prepared that are characterized by good stability, even in the absence of added stabilizing agents such as xanthan, guar, locust bean gums, and the like. As Table VII demonstrates, for example, at solids contents above about 50%, unstable conditions may be encountered, with viscosities up to about 350 cps.

Urea is the material of choice for use in the present invention for the nitrogen containing reactant. However, other amino compounds that combine with formaldehyde may also be used. Examples of other suitable amino compounds include melamine, methyl urea, 1,3-dimethyl urea, ethyl urea, and the like. If used, such compounds preferably are used as partial replacements for the urea. Although the above examples utilized urea, it is understood that these other amino compounds can be utilized for all or a part of the urea.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A process for preparing an aqueous suspension of a urea-formaldehyde condensation product which comprises:
   (a) adding urea to an acidic solution of formaldehyde at a pH not above about 1.75 at a temperature between about 50° C. and about 98° C. to form a condensate having a mole ratio of formaldehyde to urea of about 3.5:1 to 2.6:1;
   (b) adjusting the reaction mixture of (a) above, to a pH of about 5.2 to about 6.8 and adding further urea while said mixture is at a temperature of about 75° C. to about 92° C. until the mole ratio of formaldehyde to urea is about 0.5:1 to 1.8:1, and permitting the condensation to continue until the reaction mixture has a nephelometric turbidity reading in the range of 200 to 800 NTU units; and then
   (c) neutralizing the reaction mixture to a pH of about 7.1 to 8.5.

2. The process in accordance with claim 1 wherein there is added to the base neutralized reaction mixture a stabilizing quantity of a suspending agent.

3. The process in accordance with claim 1 including adding to the neutralized reaction product a sufficient number of moles of urea per mol of formaldehyde to attain a mole ratio of formaldehyde to urea of 0.9:1 to 1.1:1, and maintaining the pH of the final product at about 7.3 to about 7.5.

4. The process in accordance with claim 1 including adding from about 2% to 15% by weight $P_2O_5$ equivalent of a soluble phosphate compound to the base neutralized reaction mixture.

5. The process in accordance with claim 1 including adding from about 2% to 7% by weight $K_2O$ equivalent of a soluble potassium compound to the base neutralized reaction mixture.

6. The process of claim 1 wherein the initial pH of the acidic formaldehyde solution is in the range 0.5 to 1.5.

7. The process of claim 6 wherein the pH of the acidic solution of formaldehyde is below 1.1.

8. The process of claim 7 wherein the pH of the acidic solution of formaldehyde is in the range 0.9 to 1.1.

9. The process of claim 6 wherein the mole ratio of formaldehyde to urea is about 3.1:1 to 2.9:1.

10. The process of claim 9 wherein the mole ratio of formaldehyde to urea is about 3.0:1.

11. The process of claim 1 wherein, following step (a), the reaction mixture is held at a temperature in the range from about 70° C. to about 95° C. to permit equilibration to occur.

12. The process of claim 1 wherein the temperature in (b) is maintained, during the further addition of urea to the reaction mixture, in the range 83° C. to 87° C.

13. the process of claim 1 wherein the pH of the reaction mixture in step (b) is initially adjusted to the range 5.7 to 6.3.

14. The process of claim 13 wherein the pH is adjusted to the range 5.8 to 6.0.

15. The process of claim 1 wherein, in step (b), the addition of urea is continued until the mole ratio of formaldehyde to urea is in the range of 0.75:1 to 1.5:1.

16. The process of claim 15 wherein the addition of urea is continued until the mole ratio of formaldehyde to urea is in the range 0.9:1 to 1.1:1.

17. The process of claim 15 wherein the condensation in step (b) is permitted to continue until the turbidity reading is from 400 to 775 NTU units.

18. The process of claim 16 wherein the condensation in step (b) is permitted to continue until the turbidity reading is from 680 to 730 NTU units.

19. The process of claim 17 wherein, in step (c), the reaction mixture is neutralized to a pH in the range 7.3 to 7.5.

20. The process of claim 1 wherein the aqueous urea-formaldehyde condensation product has a mole ratio of formaldehyde to urea in the range 0.4:1 to 1.8:1.

21. The process of claim 20 wherein the product has a formaldehyde to urea mole ratio of 0.75:1 to 1.5:1.

22. The process of claim 21 wherein the aqueous suspension product has a solids content in the range 40% to 70%.

23. The process of claim 22 wherein the Activity Index of the product is at least 70.

24. The process of claim 21 wherein the solids content of the aqueous suspension product is in the range 45% to 65%.

25. The process of claim 24 wherein the aqueous suspension product has an Activity Index of at least 70.

26. A process for preparing an aqueous suspension of a ureaform type resin condensation product, which comprises:
    (a) adding urea to an acidic solution of formaldehyde at a pH in the range 0.5 to 1.5, at a temperature in the range 50° C. to about 98° C., to form a condensate having a molar ratio of formaldehyde to urea in the range 2.9:1 to 3.1:1, then holding the reaction mixture at a temperature in the range 70° C. to 95° C. to permit equilibration;
    (b) adjusting the pH of the reaction mixture from the preceding step to a value in the range 5.8 to 6.0, and adding urea while the reaction mixture is at a temperature in the range 83° C. to 87° C. until the molar ratio of formaldehyde to urea is in the range 0.75:1 to 1.5:1, and permitting the condensation reaction to go forward until the reaction mixture has attained a reading on the nephelometric turbidity unit in the range 400 to 775 NTU units, and then
    (c) neutralizing the reaction mixture to a pH in the range 7.3 to 7.5;
to produce a stable ureaform type resin condensation product having a molar ratio of formaldehyde to urea in the range 0.75:1 to 1.5:1 and a solids content in the range 45% to 65%, said product having an Activity Index of at least 70.

27. The process of claim 26 wherein the solids content of the product suspension is in the range 49% to 53%.

28. A process for preparing an aqueous suspension of a urea-formaldehyde condensation product which comprises:
    (a) adding urea to a solution of formaldehyde that is at an initial pH of about 0.9 to about 1.1 while maintaining the temperature of the reaction mixture below about 98° C. until the mole ratio of formaldehyde to urea is in the range about 2.9 to about 3.1 moles of formaldehyde for each mole of urea;
    (b) adjusting the reaction mixture to a pH of about 5.8 to about 6.0 and continuing the reaction by adding urea to the reaction mixture at a temperature of about 75° C. to 92° C. until a mole ratio of about 0.9 to about 1.1 moles of formaldehyde per mole of urea is obtained and the reaction mixture has a nephalometric turbidity reading in the range of 680 to 730 NTU units; and then
    (c) neutralizing the reaction mixture to a pH of about 7.3 to about 7.5, to produce a stable ureaform type resin suspension having a molar ratio of formaldehyde to urea of 0.9:1 to about 1.1:1, and an Availability Index of at least 70.

29. A fertilizer composition comprising an aqueous suspension of a urea-formaldehyde condensate prepared by the process of claim 1.

30. A fertilizer composition comprising an aqueous suspension of a condensate of urea and formaldehyde prepared by the process of claim 26.

31. An aqueous dispersion of a urea-formaldehyde condensation product having a molar ratio of formaldehyde to urea in the range from about 0.5:1 to about 1.8:1, a solids content of 40% to 70%, and a pH of 7.1 to 8.5, said condensation product being a ureaform type resin formed by an initial acid reaction of urea with formaldehyde wherein urea is added to an acidic formaldehyde solution at a pH not above about 1.75, to attain a formaldehyde/urea molar ratio of 3.5:1 to 2.6:1, at a temperature in the range of 50° C. to about 98° C., to produce an acidic reaction mixture, followed by a further reaction at a higher but still acidic pH during which more urea is added to said reaction mixture at a temperature in the range 75° C. to 92° C. and at a pH of about 5.2 to about 6.8, to obtain a formaldehyde/urea molar ratio of 0.5:1 to 1.8:1, and a nephelometric turbidity reading of 200 to 800 NTU units.

32. A dispersion according to claim 31 wherein the molar ratio of formaldehyde to urea in said dispersion is 0.9:1 to about 1.1:1, and said dispersion has a solids content of 45% to 65%.

33. The dispersion of claim 32 wherein the solids content is about 49% to about 53%, the pH is 7.3 to 7.5, and the viscosity range after storage for 109 days at 72° F. is not more than 150 cps, as measured with a Brookfield Viscometer Model RVF, using a No. 1 spindle, at 20 rpm and at 25° C.

34. An aqueous dispersion of a urea-formaldehyde condensation product produced by the process of claim 3 and having a molar ratio of formaldehyde to urea in the range from about 0.9:1 to about 1.1:1 and a pH of 7.3 to 7.5, said dispersion being characterized by having a solids content in the range 49% to 53%, a viscosity as produced of about 20 cps to about 250 cps and a viscosity after storage for 109 days at a temperature of 72° F. not in excess of about 250 cps as measured on a Brookfield Viscometer Model RVF, No. 1 spindle, at 20 rpm and at 25° C., and by a nitrogen content in the range from about 17% to about 25%.

35. A fertilizer composition comprising an aqueous suspension of an acid catalyzed urea-formaldehyde condensate produced by the process of claim 28 and having a formaldehyde to urea molar ratio of about 0.9:1 to 1.1:1, and a solids content of from about 49% to 53%.

* * * * *